Nov. 29, 1932.                C. P. SHERWOOD                1,889,705
                                 FLOW METER
                        Filed March 16, 1931       2 Sheets-Sheet 1
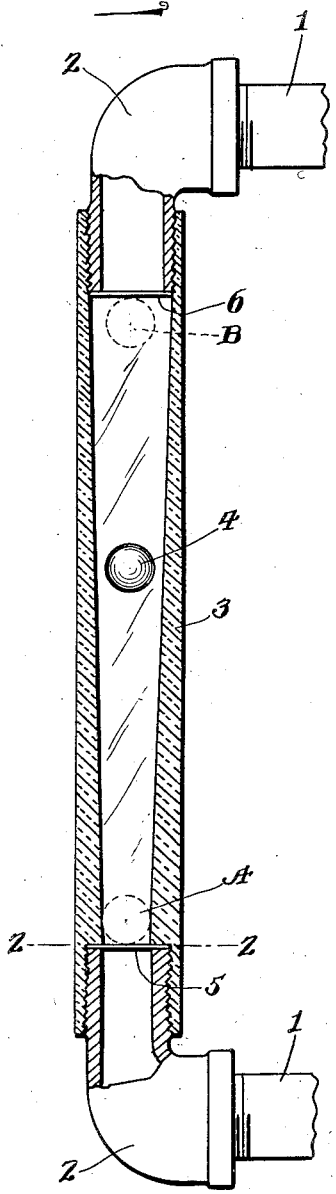
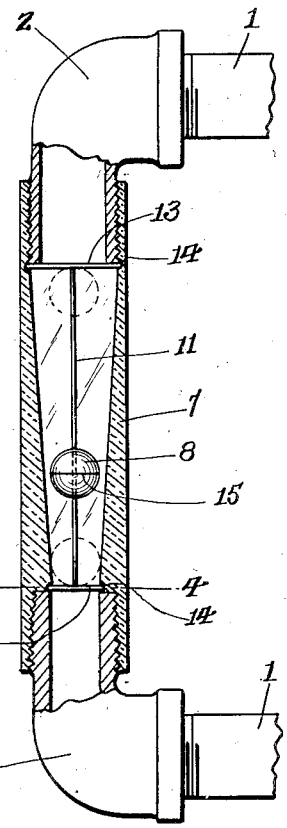
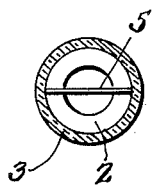
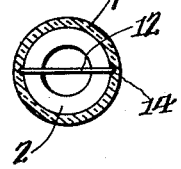
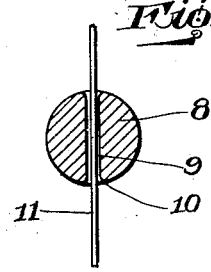
Inventor
Carroll P. Sherwood
By Geo. F. Kimmel
          Attorney Nov. 29, 1932.   C. P. SHERWOOD   1,889,705
FLOW METER
Filed March 16, 1931   2 Sheets-Sheet 2
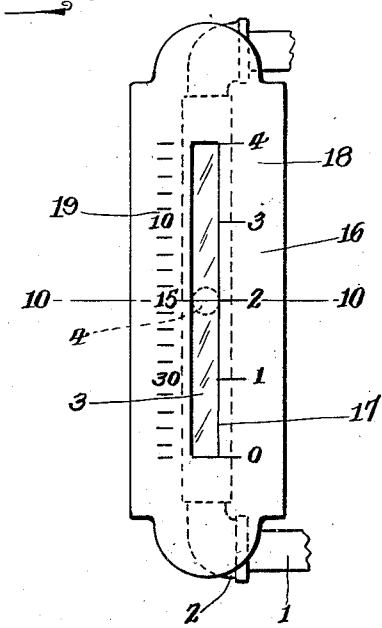
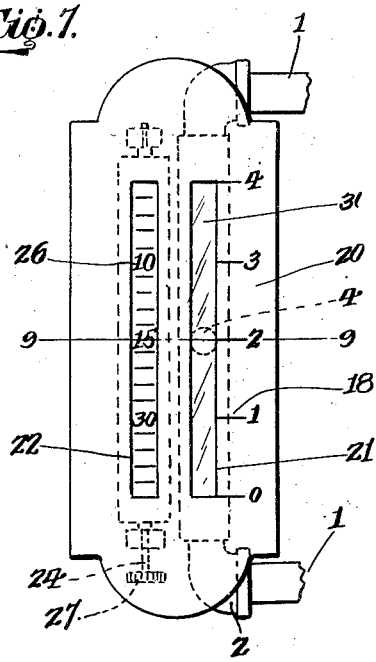
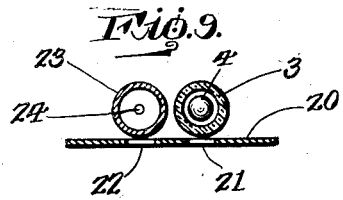
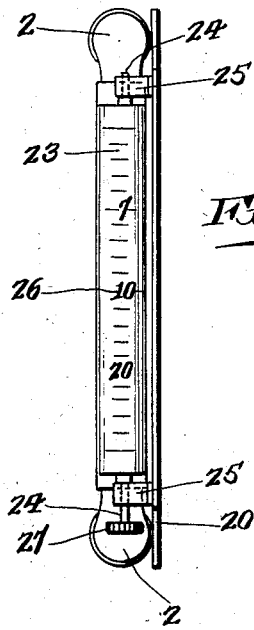
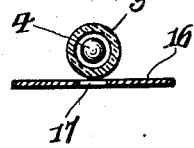
Inventor
Carroll P. Sherwood
By Geo. P. Kimmel
Attorney Patented Nov. 29, 1932

1,889,705

UNITED STATES PATENT OFFICE

CARROLL P. SHERWOOD, OF CAMDEN, NEW JERSEY

FLOW METER

Application filed March 16, 1931. Serial No. 523,064.

This invention relates to a flow meter particularly adapted for use in connection with motor vehicles.

The primary object of the invention is to provide a sensitive and accurate device for indicating variations in the rate of flow of fuel consumed by a vehicle motor which is capable of manufacture at a cost sufficiently low to render the same practical for general use on motor vehicles; which operates without the necessity of moving parts with the exception of the indicator; and which is substantially indestructible.

A further object of the invention is to provide a device of the character aforesaid including a tapered, transparent tube adapted to be connected with a fuel line without the necessity of employing gaskets or the like and having a spherical buoyant member therein which rises within the tube in direct proportion to the rate of flow of fuel therethrough.

A further object of the invention is to provide a device including a tapered tube having a buoyant member therein as aforesaid wherein stop means are provided at the inlet end of the tube to limit the buoyant member to a position to close the tube without any likelihood of sticking, and wherein similar stop means are provided at the outlet end of the tube to limit movement of the buoyant member without substantially diminishing the area of the fuel passage, the latter stop means thereby providing an effective governor by means of which the maximum rate of flow of fuel may be limited to any desired quantity at the time of constructing the tube.

A further object of the invention is to provide a device of the character aforesaid which is adapted to be used in connection with a scale embodying calculations of the mileage of a vehicle per unit of fuel at any given speed in order that the efficiency of the vehicle may be readily calculated at different speeds, and also verified at different times at the speed of maximum efficiency for any particular vehicle.

With the foregoing and other objects in view, the invention consists of the novel construction, combination and arrangement of parts as hereinafter more particularly described and shown in the accompanying drawings, but it is to be understood that the description and drawings are to be considered as illustrative rather than limitative.

In the accompanying drawings wherein like reference characters are employed to designate like parts throughout the several views:

Figure 1 is a longitudinal section showing the tube and buoyant member.

Figure 2 is a section taken on the line 2—2 of Figure 1.

Figure 3 is a longitudinal section showing a modified form of tube and buoyant member.

Figure 4 is a section taken on the line 4—4 of Figure 3.

Figure 5 is a vertical section through the buoyant member of Figure 3 showing the guide therefor.

Figure 6 is an elevation showing the flow meter in association with a scale for indicating mileage per unit of fuel at a given speed.

Figure 7 is a similar view showing the use of the flow meter with an adjustable member provided with a plurality of scales for indicating the mileage at different speeds selectively.

Figure 8 is a side elevation of the embodiment shown in Figure 7.

Figure 9 is a section taken on the line 9—9 of Figure 7.

Figure 10 is a section taken on the line 10—10 of Figure 6.

Referring to the drawings in detail, the numeral 1 indicates two sections of a fuel line which are connected by means of coupling members 2 with a vertically disposed tube 3. The tube 3 is of transparent material, preferably a celluloid composition, and is internally threaded at the ends thereof for engagement by the external threads of the couplings 2. By threading the couplings 2 into the ends of the tube 3, a fluid tight joint may be had between the tube and couplings 2 without the aid of gaskets or the like, thereby eliminating any possibility of leakage and also reducing the fire hazard to a minimum.

Between the internally threaded end portions thereof, the inner face of the tube 3 is tapered whereby the inner diameter thereof gradually increases in an upward direction. Disposed within the tube 3 is a buoyant member 4 in the form of a sphere, preferably made of aluminum. The diameter of the member 4 is slightly greater than the minimum inner diameter of the tube 3 in order that the passage through the tube 3 may be effectively closed by the member 4 when the latter is adjacent the lower end of the tube.

Extending across the lower end of the tapered portion of the tube 3 is a stop member 5 which preferably is secured in any suitable manner to the inner end of the lower coupling member 2. The stop member 5 preferably is formed of a thin metal wire which is softer than the member 4 in order that the latter will not become disfigured by the abutment thereof against the stop member 5. The stop member 5 limits the downward movement of the buoyant member 4 to a position where the inner diameter of the tube 3 equals the diameter of the member 4 in order that the passage will be closed to the passage of fuel therethrough without any likelihood of the ball becoming stuck within the tube. This position of the member 4 is shown in dotted lines in Figure 1 and designated A.

Extending across the upper end of the tapered portion of the tube 3 is a similar stop member 6 which limits the upward movement of the member 4 to a position wherein the distance between the member 4 and the end face of the upper coupling 2 equals or exceeds the distance between the buoyant member 4 and the inner wall of the tube 3 in order that the supply of fuel passing through the tube will not be diminished when the buoyant member is in abutment with the stop member 6. The position of the buoyant member 4 in abutment with the stop member 6 is shown in dotted lines in Figure 1 and designated B.

In Figure 3 is shown a pair of fuel line sections 1 having couplings 2 connecting the same with a tube 7 which is formed of the same material as the tube 3. The inner face of the tube 7 is tapered between the internally threaded end portions thereof in order to gradually increase the inner diameter of the tube in an upward direction. The minimum and maximum inner diameters respectively of the tube 7 are the same as those for the tube 3 although the tube 7 is of materially less length than the tube 3, consequently the cross sectional area of the interior of the tube 7 increases in an upward direction more rapidly than the cross sectional area of the tube 3.

Disposed within the tube 7 is a buoyant member 8 in the form of a sphere preferably of aluminum, which is provided with an opening 9 extending through the center thereof. The end walls of the opening 9 are slightly rounded as indicated at 10 in order that there will be no likelihood of the walls of the opening damaging a wire 11 which extends through the member 8 longitudinally of the tube 7. The ends of the wire 11 are anchored to stop members 12 and 13 similar to the stop members 5 and 6 heretofore described in connection with the embodiment shown in Figure 1. The stop members 12 and 13 may be secured to the tube 7 in any suitable manner, such as by extending end portions of the members into depressions 14 in the wall of the tube adjacent the threaded portions thereof. The stop member 12 limits the downward movement of the buoyant member 8 to a position where the diameter of the member 8 equals the inner diameter of the tube 7, while the stop member 13 limits the upward movement of the member 8 to a position where the distance between the member 8 and the inner end of the upper coupling 2 equals or exceeds the distance between the member 8 and the inner wall of the tube.

By employing the guide wire 11, the buoyant member 8 is maintained at all times centrally of the tube 7 whereby the tube may be relatively short with a rapidly increasing cross sectional area in an upward direction. Preferably a line 15 is suitably inscribed on the member 8 in order that the position of the buoyant member 8 may be readily determined with respect to a scale located adjacent the tube 7.

The length of the tubes 3 or 7 may be varied as desired, depending upon the maximum amount of fuel it is desired to pass therethrough. By properly regulating the proportion of the maximum inner diameter of the tube with respect to the diameter of the buoyant member, the stop member at the outlet end of the tube may be utilized as a governor to limit the fuel which may pass through the tube in a given time to any quantity desired.

In Figure 6, the flow meter tube is shown in connection with a plate 16 formed with a slot 17 through which the tube is visible. The plate 16 may be conveniently located on the dash of a vehicle body, and the tube 3 may be secured to the rear face thereof in any suitable manner. Inscribed on the face of the plate 16, at one side of the slot 17, is a row of indicia 18 which may designate the amount of fuel passing through the tube in gallons per hour. Inscribed on the face of the plate 16, at the opposite side of the slot 17, is a row of indicia 19 which may designate the mileage of a vehicle per unit of fuel, such as miles per gallon when the vehicle is travelling at a given speed. In the embodiment shown in Figure 6, the row of indicia 19 designates the mileage of the vehicle in miles per gallon when the vehicle is travelling at a speed of thirty miles per hour. Obviously if the vehicle is travelling at a speed of thirty miles per hour and is consuming one gallon of fuel in an hour, the mileage of the vehicle in miles per gallon will be thirty, while if the vehicle is consuming two gallons of fuel per hour the mileage in miles per gallon will be fifteen, and so forth. The indicia employed in the row 19 may represent the mileage of the vehicle at any speed desired, and may be utilized in calculating the mileage in miles per gallon at any other speed. In Figure 6, the buoyant member 4 is shown in a position between the numeral 2 of the row of indicia 18 and the numeral 15 of the row of indicia 19, therefore it is known at a glance that the vehicle is travelling at the rate of fifteen miles per gallon of fuel.

In Figure 7 a modified form of plate 20 is shown which is provided with a pair of slots 21 and 22. The tube 3 is suitably secured to the rear face of the plate 20 so as to be visible through the slot 21, while a cylinder 23 is disposed rearwardly of the plate 20 in a manner to be visible through the slot 22. The cylinder 23 is rotatably mounted, preferably having a pair of pintles 24 extending through apertured lugs 25 projecting from the rear face of the plate 20. Suitably inscribed on the cylinder 23 are a plurality of rows of indicia such as shown at 26, each of which represents the mileage of a vehicle in miles per gallon at a different rate of speed of the vehicle. The lowermost pintle 24 is provided with an operating member, such as the knurled disc 27 in order that the cylinder 23 may be rotated to selectively render the rows of indicia thereon visible through the slot 22. Any suitable means may be provided to prevent accidental rotation of the cylinder 23, this preferably being accomplished by a snug fit between the pintles 24 and the lugs 25 through which the pintles extend. The numeral of the indicia 26 which appears directly opposite the numeral 1 of the indicia 18 designates the speed of the vehicle which the visible row of indicia 26 represents.

It is thought that the many advantages of a flow meter in accordance with this invention will be readily apparent, and although the flow meter preferably will be constructed in accordance with the embodiments herein illustrated and described, it is to be understood that changes in the details of construction may be resorted to, so long as such changes fall within the scope of the claims hereunto appended.

What I claim is:—

1. In a flow meter, a vertically disposed transparent tube adapted for connection with a fluid line and having a downwardly tapering inner diameter, a buoyant sphere disposed within the tube for indicating relative rates of flow of fluid through the tube, said sphere having an opening extending diametrically therethrough, a pair of stop members extending across the tube at its points of minimum and maximum inner diameters respectively, and a guide wire extending longitudinally of the tube and through said sphere and having its ends anchored to said stop members, said sphere having a circumferentially extending indicating line midway between the ends of the opening through the sphere.

2. In a flow meter, a vertically disposed transparent tube adapted for connection with the fuel line of a motor vehicle and having a downwardly tapering inner diameter, a buoyant sphere disposed within the tube for indicating relative rates of flow of fuel through the tube, stop members extending across the tube at its points of minimum and maximum diameter respectively, a plate having a pair of slots, said tube being visible through one of said slots, a cylinder visible through the other of said slots and having a plurality of scales respectively designating the mileage of the vehicle in miles per gallon of fuel at varying speeds, said cylinder being manually rotatable to render said scales visible selectively, and means for maintaining said cylinder in position to maintain the visibility of a selected scale.

3. In a flow meter, a vertically disposed transparent tube adapted for connection with a fluid line and having a downwardly tapering inner diameter, a buoyant sphere disposed within the tube for indicating relative rates of flow of fluid through the tube, and a pair of stops extending across the tube at its points of minimum and maximum diameter respectively to limit movement of said sphere, said stop members being formed of relatively thin wire of softer material than that of said sphere to prevent disfiguring of the sphere and further to prevent any substantial obstruction to the passage of fluid through the tube.

In testimony whereof, I affix my signature hereto.

CARROLL P. SHERWOOD.